US009368865B2

(12) United States Patent
Bäckman et al.

(10) Patent No.: US 9,368,865 B2

(45) Date of Patent: Jun. 14, 2016

(54) ANTENNA ASSEMBLY WITH SHIELDING STRUCTURE

(75) Inventors: Anders Bäckman, Göteborg (SE); Anders Höök, Hindås (SE)

(73) Assignee: SAAB AB, Linkoeping (SE)

( * ) Notice: Subject to any disclaimer, the term of this patent is extended or adjusted under 35 U.S.C. 154(b) by 185 days.

(21) Appl. No.: 14/357,494

(22) PCT Filed: Nov. 15, 2011

(86) PCT No.: PCT/SE2011/051371

§ 371 (c)(1), (2), (4) Date: Nov. 3, 2014

(87) PCT Pub. No.: WO2013/074004

PCT Pub. Date: May 23, 2013

(65) Prior Publication Data

US 2015/0214613 A1 Jul. 30, 2015

(51) Int. Cl.

| | |
|---|---|
| ***H01Q 1/52*** | (2006.01) |
| ***H01Q 1/24*** | (2006.01) |
| ***H01Q 21/28*** | (2006.01) |

(Continued)

(52) U.S. Cl.

CPC ............... *H01Q 1/525* (2013.01); *H01Q 1/246* (2013.01); *H01Q 1/526* (2013.01); *H01Q 3/14* (2013.01); *H01Q 9/26* (2013.01); *H01Q 21/28* (2013.01);

(Continued)

(58) Field of Classification Search

CPC ... H01Q 1/1235; H01Q 1/1242; H01Q 1/246; H01Q 1/525; H01Q 1/526; H01Q 3/14; H01Q 9/26

USPC .......... 343/705, 801, 803, 841, 853, 890, 891

See application file for complete search history.

(56) References Cited

U.S. PATENT DOCUMENTS 4,945,362 A * 7/1990 Keiser .................. H01Q 17/007 343/753

5,038,151 A 8/1991 Kaminski (Continued)

FOREIGN PATENT DOCUMENTS

EP 117240 A1 8/1984

FR 2 478 380 9/1981

(Continued)

OTHER PUBLICATIONS

International Search Report for PCT/SE2011/051371, date of mailing: Jul. 23, 2012.

(Continued)

*Primary Examiner* — Tho G Phan

(74) *Attorney, Agent, or Firm* — Alston & Bird LLP

(57) ABSTRACT

The present invention relates to an antenna assembly (2, 102, 202, 302) comprising: a plurality of transmit antennas, at least one receive antenna (4), at least one shielding structure (6), and at least one frame (8), wherein the at least one frame is configured for: setting a pointing direction of a first transmit antenna (10) such that a first transmit minimum (16) of the first receive antenna (10) points towards a first zone (24), and setting a pointing direction of a second transmit antenna (12) such that a second transmit minimum (18) of the second antenna (12) points towards a second zone (26), whereby coupling of radiation from the plurality of transmit antennas to the receive antenna (4) is reduced.

22 Claims, 10 Drawing Sheets

(51) Int. Cl.
*H01Q 3/14* (2006.01)
*H01Q 9/26* (2006.01)
*H01Q 1/12* (2006.01)
*H01Q 1/18* (2006.01)

(52) U.S. Cl.
CPC ............ *H01Q 1/1235* (2013.01); *H01Q 1/1242* (2013.01); *H01Q 1/18* (2013.01)

(56) References Cited

U.S. PATENT DOCUMENTS

| | | | | |
|---|---|---|---|---|
| 5,673,055 | A * | 9/1997 | Hansen | H01Q 9/36 343/752 |
| 6,052,092 | A * | 4/2000 | Davis | H01Q 1/1242 343/757 |
| 6,803,883 | B2 * | 10/2004 | Abrams | H01Q 1/44 343/702 |
| 7,348,930 | B2 * | 3/2008 | Lastinger | H01Q 1/246 343/841 |
| 7,812,779 | B2 * | 10/2010 | Turner | G01D 21/00 343/841 |
| 2002/0149534 | A1 | 10/2002 | Bobier | |
| 2011/0243201 | A1 | 10/2011 | Phillips et al. | |

FOREIGN PATENT DOCUMENTS

| | | |
|---|---|---|
| GB | 1047577 | 11/1966 |
| WO | WO 00/51201 A1 | 8/2000 |

OTHER PUBLICATIONS

Written Opinion of the International Searching Authority for PCT/SE2011/051371, Jul. 23, 2012.

European Patent Office, Extended European Search Report for Application No. 11875729.3, May 4, 2015, 11 pages, Germany.

* cited by examiner

ANTENNA ASSEMBLY WITH SHIELDING STRUCTURE

CROSS REFERENCE TO RELATED APPLICATIONS

This application is a National Stage Application, filed under 35 U.S.C. §371, of International Application No. PCT/SE2011/051371, filed Nov. 15, 2011, the contents of which are hereby incorporated by reference in their entirety.

BACKGROUND

1. Related Field

The present invention relates to the field of antenna assemblies, such as an antenna assembly comprising a plurality of transmit antennas and at least one receive antenna.

2. Description of Related Art

An antenna assembly, as known in the prior art, may comprise a plurality of antennas. In order to improve decoupling of one antenna from transmissions by other antennas the antennas may be stacked collinearly on top of each other such that minima in transmit patterns of the other antennas points towards the one antenna. This solution for an antenna assembly results in that the antenna assembly will have an extension that is at least equal to the combined individual extensions of the individual antennas, i.e. a considerable extension, especially for antenna assemblies with numerous antennas, e.g. 4 or more. Alternatively, a substantial horizontal separation of the antennas may be provided. This solution requires a substantially large distance between antennas and therefore also requires a large extension of the antenna assembly as such.

Thus, there is a need for improving decoupling between antennas in an antenna assembly while allowing a suitable compact extension of the antenna assembly. In particular, there is a need for reducing coupling from a plurality of transmit antennas to one or more receive antennas in an antenna assembly. Furthermore, there is a need for an antenna assembly enabling an improved collocation performance of multiple radio transceivers, i.e. transmitters and receiver(s).

BRIEF SUMMARY

According to the present invention, the above-mentioned and other objects are fulfilled by a first aspect of the present invention relating to an antenna assembly comprising: a plurality of transmit antennas including a first transmit antenna and a second transmit antenna, at least one receive antenna including a first receive antenna, at least one shielding structure, and at least one frame.

The first transmit antenna has a first transmit pattern with a first transmit minimum when transmitting. The first transmit minimum is at least a local minimum in the first transmit pattern, but may as well be a global minimum.

The second transmit antenna has a second transmit pattern with a second transmit minimum when transmitting. The second transmit minimum is at least a local minimum in the second transmit pattern, but may as well be a global minimum.

The at least one shielding structure is configured for obstructing (or at least impeding) direct electromagnetic radiation generated by the plurality of transmit antennas. Direct radiation refers to radiation for which the direction of propagation follows a “line of sight” (i.e. e.g. a straight line) without being diffracted as such.

The at least one frame is configured for setting mutual positions of: the plurality of transmit antennas, the at least one shielding structure, and the at least one receive antenna, such that the at least one shielding structure shields (i.e. e.g. obstructs or impedes) the at least one receive antenna from direct electromagnetic radiation generated by the plurality of transmit antennas.

The setting of mutual positions defines a plurality of zones at the at least one shielding structure. The plurality of zones includes a first zone and a second zone.

The first zone is defined by that (or given by that): radiation, which emanates from the first transmit antenna and which is diffracted by the at least one shielding structure towards the at least one receive antenna, is subject to a lower power loss (i.e. higher coupling) if diffracted by the at least one shielding structure at the first zone than if diffracted by the at least one shielding structure outside the first zone.

The second zone is defined by that (or given by that): radiation, which emanates from the second transmit antenna and which is diffracted by the at least one shielding structure towards the at least one receive antenna, is subject to a lower power loss (i.e. higher coupling) if diffracted by the at least one shielding structure at the second zone than if diffracted by the at least one shielding structure outside the second zone.

The at least one frame is configured for: setting a pointing direction of the first transmit antenna (i.e. e.g. a pointing direction of the first transmit antenna in relation to the at least one shielding structure) such that the first transmit minimum points towards the first zone, and setting a pointing direction of the second transmit antenna (i.e. e.g. a pointing direction of the second transmit antenna in relation to the at least one shielding structure) such that the second transmit minimum points towards the second zone.

Thus, a reduced diffraction of radiation from the plurality of transmit antennas towards the at least one receive antenna is provided by the present invention.

A second aspect of the present invention relates to a method for shielding at least one receive antenna of an antenna assembly (e.g. an antenna assembly according to the present invention) from radiation emanating from a plurality of transmit antennas of the antenna assembly by means of at least one shielding structure of the antenna assembly.

The plurality of transmit antennas includes a first transmit antenna and a second transmit antenna. The first transmit antenna has a first transmit pattern with a first transmit minimum when transmitting. The second transmit antenna has a second transmit pattern with a second transmit minimum when transmitting.

The at least one receive antenna includes a first receive antenna.

The at least one shielding structure is configured for obstructing direct electromagnetic radiation generated by the plurality of transmit antennas.

The method comprises setting, by means of at least one frame of the antenna assembly, mutual positions of: the plurality of transmit antennas, the at least one shielding structure, and the at least one receive antenna, such that the at least one shielding structure shields the at least one receive antenna from direct electromagnetic radiation generated by the plurality of transmit antennas.

The setting of mutual positions defines a plurality of zones at the at least one shielding structure. The plurality of zones includes a first zone and a second zone.

The first zone is defined by that (or given by that): radiation, which emanates from the first transmit antenna and which is diffracted by the at least one shielding structure towards the at least one receive antenna, is subject to a lower power loss (i.e. higher coupling) if diffracted by the at least one shielding structure at the first zone than if diffracted by the at least one shielding structure outside the first zone.

The second zone is defined by that (or given by that): radiation, which emanates from the second transmit antenna and which is diffracted by the at least one shielding structure towards the at least one receive antenna, is subject to a lower power loss (i.e. higher coupling) if diffracted by the at least one shielding structure at the second zone than if diffracted by the at least one shielding structure outside the second zone, The method comprises: setting, by means of the at least one frame, a pointing direction of the first transmit antenna such that the first transmit minimum points towards the first zone, and setting, by means of the at least one frame, a pointing direction of the second transmit antenna such that the second transmit minimum points towards the second zone. Thus, a reduced diffraction of radiation from the plurality of transmit antennas towards the at least one receive antenna is provided by the present invention.

A third aspect of the present invention pertains to use of an antenna assembly according to the present invention, wherein the antenna assembly is mounted in/on and/or forms part of a vehicle, such as a road vehicle, a ship, or an aircraft, or wherein the antenna assembly is mounted on and/or forms part of a building or wherein the antenna assembly is mounted as a ground installation.

It is an advantage of the present invention that the positioning and/or the pointing directions of the plurality of transmit antennas are arranged (or are configured to be arranged) such that radiation, which emanates from the plurality of transmit antennas, and which radiation is incident at (and which may be received by) the at least one receive antenna, is reduced. The coupling of radiation from the plurality of transmit antennas to the at least one receive antenna is reduced by the present invention. Thus, a higher degree of isolation between individual transmit antennas and the at least one receive antenna is provided compared to solutions in the prior art.

It is realized by the inventors that by pointing a respective minimum of each of the individual antenna patterns of each of the plurality of transmit antennas in respective directions that at least substantially are along respective paths representing the respective highest (or a respective high) coupling of radiation from the respective of the plurality of transmit antenna to the at least one receive antenna, a reduced coupling is achieved.

It is an advantage of the present invention that an antenna assembly having a reduced extension (e.g. reduced height and/or horizontal extension) is provided (e.g. compared to the extensions of a known solution employing horizontally separated antennas or compared to solutions with co-linearly separated antennas). Additionally, or alternatively, improved handling of the present invention may be achieved. Additionally, or alternatively, cost-effectiveness may be provided by the present invention. It is an advantage of the present invention that standard antennas (and/or possible circuitry and components that may form part of the antenna assembly or may form part of accessories to the antenna assembly) may be utilized. This may improve cost-effectiveness.

It is realized by the inventors of the present invention that collocation problems may strongly depend on the isolation between the plurality of transmit antennas and the at least one receive antennas. This may in particular become valid when consideration is given to receiver saturation, transmitter noise desensitization at the receiver, reciprocal mixing at the receiver and receiver intermodulation caused by multiple simultaneous transmit signals. The isolation between transmit and receive antennas may furthermore be important to reduce the level of intermodulation that may be caused by a transmitter output amplifier stage.

Traditional antenna integration solutions may rely on costly collocation filters and other circuitry, but also on careful frequency planning. The solution according to the present invention may address the described collocation issues, and thereby may provide a solution enabling lesser constraints with respect to frequency planning.

Performance advantages may be obtained by employment of solutions based on multiple carrier amplifiers feeding common transmit antenna(s). Such highly linear amplifiers are both more costly, but will also be demanding from a power supply and power consumption perspective. In comparison, an obvious advantage with the present invention is that less (or no essential) concern may be needed from an output amplifier and antenna impedance matching perspective including reflections caused by antenna mismatch.

It is an advantage of the present invention that minimized degradation is achieved with respect to performance for coverage and/or range performance related to radio propagation from transmit antennas.

Solutions based on multiple carrier amplifiers may be used to feed an array of antennas in order to create a desired antenna pattern, or at least close to a desired pattern. Even if such antenna solution could provide an accurate combined antenna pattern, it may be very costly due to matching of feeder circuitry, something which the described solution does not suffer from.

BRIEF DESCRIPTION OF THE FIGURES

The above and other features and advantages of the present invention will become readily apparent to those skilled in the art by the following detailed description of exemplary embodiments thereof with reference to the attached drawings, in which.

The figures are schematic and simplified for clarity, and they may merely show details which are essential to the understanding of the invention, while other details may have been left out. Throughout, the same reference numerals are used for identical or corresponding parts.

Figure 1:
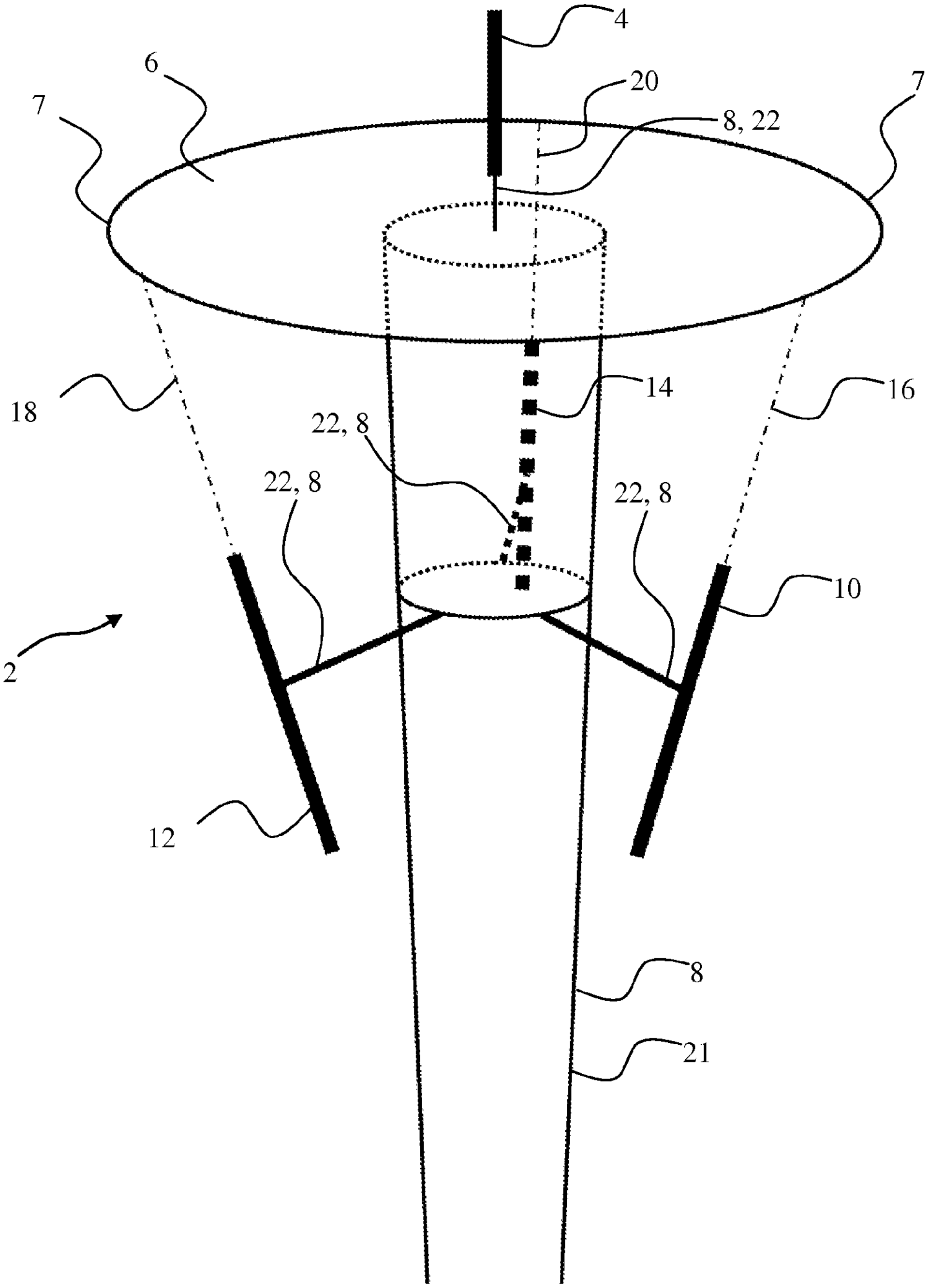
FIG. 1 schematically illustrates a perspective view of an embodiment of the present invention, FIG. 2 schematically illustrates a part of the embodiment illustrated in FIG. 1, FIGS. 3-5 schematically illustrate an embodiment of the present invention in three different states.

It should be noted that in addition to the exemplary embodiments of the invention illustrated in the accompanying drawings, the invention may be embodied in different forms and should not be construed as limited to the embodiments set forth herein. Rather, these embodiments are provided so that this disclosure will be thorough and sufficient, and will fully convey the concept of the invention to those skilled in the art.

DETAILED DESCRIPTION OF VARIOUS EMBODIMENTS

The at least one shielding structure may comprise a first shielding structure. The at least one shielding structure may comprise a plurality of shielding structures including a second shielding structure. At least a part of the at least one shielding structure may be made of a material comprising metal, such as sheet metal or metal foam. The first shielding structure may have a first extension of at least 10 cm, such as at least 25 cm, such as at least 50 cm, such as at least 1 m, such as at least 2 m. The first extension may be defined in relation to a first distance between the at least one receive antenna and the first transmit antenna (i.e. a distance between the closest points of the respective antennas) during operation (or at least intended operation) of the antenna assembly. The first extension may be within 0.5 to 3 times the first distance, such as within 1 to 2 times the first distance. The first extension of the first shielding structure may be defined as an extension of the shielding structure as measured perpendicular to (e.g. projected onto) a line between the first transmit antenna and the first receive antenna during operation of the antenna assembly. A second extension of the at least one shielding structure may be defined as an extension of the shielding structure as measured perpendicular to (e.g. projected onto) a line between the second transmit antenna and the at least one receive antenna during operation of the antenna assembly. The second extension may be similar to the first extension.

The at least one shielding structure may be perforated, e.g. by having one or more through holes. One or more of the one or more perforations (or through holes) may be situated in/at the centre of the shielding structure. The at least one shielding structure may comprise an evenly distribution of a plurality of through holes being significantly smaller than (i.e. e.g. smaller than 1/20 of such as smaller than 1/30 of) the wavelength (or wavelength range) of the radiation from the transmit antennas.

The first shielding structure may be positioned between the first transmit antenna and the at least one receive antenna. This may enable/improve shielding of radiation.

The antenna assembly according to the present invention may be configured to be installed such that the at least one receive antenna is situated above or below the shielding structure, and/or such that the plurality of transmit antennas are situated on the opposite position of the shielding structure than the at least one receive antenna. Provision hereof may have the advantage of providing an (at least substantially) omni-directional coverage for transmission and reception (for instance for transmitting and receiving horizontally at zero degrees elevation). Thus, it is an advantage that the shielding structure may be oriented such that impact in one or more possible principal communication directions (e.g. horizontally or substantially horizontally) is reduced.

The first zone may be located at an outline of a first contour of the at least one shielding structure as defined from the position of the first transmit antenna. The position of a transmit antenna may be understood as the position (or a seemed/deemed position) from where radiation generated by that transmit antenna is emanating. More specifically, the first zone may include a first part of the first contour. The at least one shielding structure may comprise a first planar surface part at the first zone. The at least one shielding structure may comprise a first edge. A first part of the first edge may be within the first zone, i.e. the first zone may e.g. comprise the first part of the first edge. The first part of the first edge may coincide with the first part of the first contour.

The second zone may be located at an outline of a second contour of the at least one shielding structure as defined from the position of the second transmit antenna. More specifically, the second zone may include a part of the second contour.

The extent of a zone of the plurality of zones may be defined by a minimum reduction to be accepted for radiation from the respective transmit antenna to the at least one receive antenna. This extent of the respective zone may define how accurate the pointing of the respective transmit antenna shall be as a minimum. The extent may e.g. be influenced by factors such as: the shape of the respective transmit antenna diagram, the shape of the at least one antenna diagram of the at least one receive antenna, and the coupling of radiation at the at least one shielding structure by means of diffraction.

For instance, a reduction of transmission power from any of the transmit antennas to the at least one receive antenna) corresponding to at least −30 dB, such as at least −35 dB in each case may be acceptable. The pointing accuracy may for instance be within a cone having an opening angle of about 15 degrees, such as within about 12, 10, or 8 degrees. Thus, the extent of the plurality of zones may be determined from the distance between the at least one shielding structure and the respective transmit antenna.

The first zone and/or the second zone may comprise a plurality of separated subzones, e.g. in case the at least one shielding structure comprises a plurality of shielding structures.

The antenna assembly (and/or the at least one frame) may be configured for setting the pointing direction of the first transmit antenna such that the first transmit minimum points along a first diffraction path going about (i.e. e.g. around an edge of) the at least one shielding structure towards the at least one receive antenna. The first diffraction path may be shorter than any immediately adjacent path (i.e. e.g. having an immediately adjacent diffraction point/area at the at least one shielding structure) from the first transmit antenna about the at least one shielding structure and towards the at least one receive antenna. Radiation along the first diffraction path may be subject to a plurality of diffractions by the at least one shielding structure.

The antenna assembly (i.e. e.g. the at least one frame) may be configured for setting the pointing direction of the second transmit antenna such that the second transmit minimum points along a second diffraction path going about (i.e. e.g. around an edge of) the at least one shielding structure towards the at least one receive antenna. The second diffraction path may be shorter than any immediately adjacent path (i.e. e.g. having an immediately adjacent diffraction point/area at the at least one shielding structure) from the second transmit antenna about the at least one shielding structure and towards the at least one receive antenna. Radiation along the second diffraction path may be subject to a plurality of diffractions by the at least one shielding structure. The antenna assembly may be configured such that each of the first transmit minimum and the second transmit minimum points towards an edge of the at least one shielding structure, such an edge of an at least substantially planar shielding structure. The edge may coincide with an outline of a contour of the shielding structure as seen from one or more of the plurality of transmit antennas. Furthermore, the antenna assembly may be configured such a transmit minimum of any additional transmit antennas of the plurality of transmit antennas points towards an edge of the at least one shielding structure.

The at least one shielding structure may comprise a radiation absorbing material such as a radiation absorbing coating. The radiation absorption may be effective for radio waves, such as such as for a wavelength range of the radiation to be emitted from the transmit antennas and/or to be received by the at least one receive antenna. The at least one shielding structure may comprise the radiation absorbing material at each of the plurality of zones, including the first zone and second zone, and possibly including larger areas of the at least one shielding structure around the plurality of zones, such as most or all of the surface parts of the at least one shielding structure or most or all of the surface parts of the at least one shielding structure facing towards the plurality of transmit antennas.

The plurality of transmit antennas may include a third transmit antenna having a third transmit pattern with a third transmit minimum when transmitting. The plurality of zones may include a third zone that may be defined by the setting of position of the third transmit antenna. The third zone may be defined by that (or given by that): radiation, which emanates from the third transmit antenna and being diffracted by the at least one shielding structure towards the at least one receive antenna, may be subject to a lower power loss if diffracted by the at least one shielding structure at the third zone than if diffracted by the at least one shielding structure outside the third zone. The antenna assembly may further be configured for setting the pointing direction of the third transmit antenna such that the third transmit minimum points towards the third zone.

Each of the plurality of transmit antennas may be configured for transmitting independent signals.

The number of the plurality of transmit antennas may be set according to (i.e. e.g. equal to) a number of signals that the antenna assembly is configured to transmit simultaneous.

Any of, such as each of or some of, the plurality of transmit antennas may be/include a dipole antenna, such as a folded dipole antenna. Reduced wind load may be achieved by means of dipole antennas compared to solutions where non-dipole antenna array constellations are needed.

The first transmit antenna may be collinear with another transmit antenna of the plurality of transmit antennas.

The at least one receive antenna may comprise one or more further receive antennas such as a second receive antenna and/or a third receive antenna.

The first receive antenna may be a biconical antenna and/or a discone antenna. A discone antenna being an antenna comprising a disc and a cone. The discone antenna may be mounted (or at least configured to be mounted) horizontally, i.e. with the disc at the top and the cone below or vice versa. The discone antenna may be mounted such that the disc thereof is closest to the at least one shielding structure and the cone is farthest from the at least one shielding structure, or vice versa. A discone antenna may exhibit advantages such as good omni-directionality and/or being vertically polarized and/or exhibiting unity gain. Furthermore, for a horizontal installation of the discone antenna the radiation pattern in the horizontal plane may be relative narrow, making the sensitivity of the discone antenna highest in a plane that is substantially within a tangent to the Earth's surface. Thus, the sensitivity may be pointed away from the at least one shielding structure, from where diffracted radiation emanated from the plurality of transmit antennas may be incident. Furthermore, the discone antenna may be configured such that a minimum (or a minimum region) in the radiation pattern thereof may be pointed towards an outline of a contour of the at least one shielding structure as seen from the receive antenna. For instance, a minimum (or a minimum region) in the radiation pattern of the receive antenna may be pointed towards the entire edge of a disc-shaped shielding structure.

Each of the plurality of transmit antennas may have an longitudinal extension of at least 5 cm, such as at least 25 cm, such as at least 50 cm, such as at least 1 m, such as at least 2 m.

The plurality of transmit antennas may be configured for transmitting at a frequency (or a frequency range) that is within 30 MHz and 3 GHz, such as within 30 and 300 MHz or within 300 and 3 GHz.

The at least one frame may be configured for setting the individual positions of the transmit antennas. The at least one frame may be configured for setting and/or adjusting the setting of individual pointing directions of the plurality of transmit antennas. This may have an advantage of optimization of decoupling, e.g. for calibration of the antenna assembly.

The at least one frame may be configured for providing that the transmit antennas are tilted in relation to each other. Tilting of the transmit antennas in relation to each other may reduce the frequency dependent influence on far field antenna pattern between the transmit antennas and/or other possible influencing structures.

The at least one frame may form at least a part of the at least one shielding structure (and/or vice versa). This may provide a cost-effective solution. The antenna assembly may be adapted to any platform on which the assembly may be employed. Thus, a mechanical structure of a given platform (such as including the at least one frame or parts thereof) may be exploited to provide at least a part of the shielding structure. Further parts of the at least one shielding structure may be added to provide possible diffraction edges where relevant.

The at least one frame may comprise a plurality of suspension parts, e.g. a suspension part for each of the plurality of transmit antennas and/or a possible suspension part for each of the at least one receive antennas.

The at least one frame may comprise a plurality of hinge-like parts and/or rotary joint parts, e.g. for performing a rotary motion of the respective transmit antennas for setting respective pointing directions. A rotary joint may be considered a joint having three degrees of freedom, e.g. such as a ball joint.

The at least one frame may comprise one or more telescopic cylinders or similar telescope-like parts for enabling one or more translatory motions of one or more parts of the antenna assembly, such as a mast part.

The antenna assembly may comprise a stabilized platform onto which the at least one frame is mounted (or is mountable) or forms part of.

The first transmit antenna may have a different polarization than the second transmit antenna. This may be achieved by a relative tilting. Thus, coupling between the first transmit antenna and the second transmit antenna may be reduced.

The plurality of transmit antennas may be separated (e.g. horizontally and/or vertically), e.g. by (substantially) the length of a transmit antenna. Such separation may improve electromagnetic isolation.

The antenna assembly may comprise and/or may be configured to be used with one or more receiving units (which may be denoted a receiver) and/or one or more transmitting units (which may be denoted a transmitter). One or more receiving units and one or more transmitting units may be combined in a transceiving unit (which may be denoted a transceiver). Thus, a transceiving unit may comprise one or more receivers and one or more transmitters. The at least one receive antenna may be configured to have at least one receiver connected thereto. One or more receivers may be configured to be connected to the at least one receive antenna via one or more low noise amplifiers and/or multi-coupler circuitry and/or power splitters.

The antenna assembly may comprise and/or may be configured to be combined with any of the following: filters, diplexers, multicouplers, low noise amplifiers, dedicated power amplifiers for the generation and/or reception of radio signals.

The first receive antenna may have a first receive pattern with a first receive minimum when receiving. The at least one frame may be configured for pointing the first receive minimum (or at least a part thereof) towards the direction of radiation emanating from the first transmit antenna position, via the at least one shielding structure, and being incident on the at least one receive antenna position. The at least one frame may be configured for pointing the first receive minimum towards the first zone and/or the second zone.

The antenna pattern of the first receive antenna may be shaped such that the first receive minimum may be pointed towards an edge of the at least one shielding structure (and/or be pointed towards an outline of a contour of the at least one shielding structure as seen from the first receive antenna). For an omni-directional antenna, such as a biconical antenna and/or a discone antenna, the minimum of the antenna pattern (null) may be like a cone with more gain above and below it. Thus, the null may not be in a single particular direction, but an infinite number of directions, e.g. all towards the edges of a possible shielding structure having a disc-like shape.

A minimum of an antenna pattern may refer to a minimum region. The minimum region may be defined by a solid angle on a sphere surrounding the respective antenna. Alternatively, or additionally, the minimum region may be defined by a part of the respective radiation pattern, which part is enclosed by a closed curve and possibly excluding a part enclosed by an inner closed curve. For instance, the minimum region may be described by the area of a respective antenna pattern which area is between two concentric circles.

The embodiment of FIG. 1 illustrates a first embodiment of an antenna assembly 2 according to the present invention. The antenna assembly 2 comprises: a plurality of transmit antennas, at least one receive antenna 4 including a first receive antenna, at least one shielding structure 6, and at least one frame 8.

The plurality of transmit antennas includes a first transmit antenna 10, a second transmit antenna 12, and a third transmit antenna 14. As seen from the perspective view of FIG. 1, the third transmit antenna 14 is situated behind a part of the at least one frame 8. Thus, the third transmit antenna 14 is illustrated by means of a dotted line. Any other part of the antenna assembly which is hidden by a part of the antenna assembly 2 as seen from the viewpoint of FIG. 1 is illustrated by means of dotted lines. The first transmit antenna 10 has a first transmit pattern with a first transmit minimum 16 when transmitting. The second transmit antenna 12 has a second transmit pattern with a second transmit minimum 18 when transmitting. The third transmit antenna 14 has a third transmit pattern with a third transmit minimum 20 when transmitting. The transmit minima 16, 18, 20 are illustrated by means of dashed-dotted lines.

The at least one shielding structure 6 is configured for obstructing direct electromagnetic radiation generated by the plurality of transmit antennas 10, 12, 14. The at least one shielding structure 6 comprises a planar and circular shielding structure comprising a first edge 7 at the circumference of the shielding structure. The at least one frame 8 is configured for setting mutual positions of: the plurality of transmit antennas 10, 12, 14, the at least one shielding structure 6, and the at least one receive antenna 4, such that the at least one shielding structure 6 shields the at least one receive antenna 4 from direct electromagnetic radiation generated by the plurality of transmit antennas. The at least one frame 8 of the embodiment of FIG. 1 comprises a mast 21 and comprises a respective suspension 22 for each of the plurality of transmit antennas 10, 12, 14 and for the at least one receive antenna 4.

Figure 2:
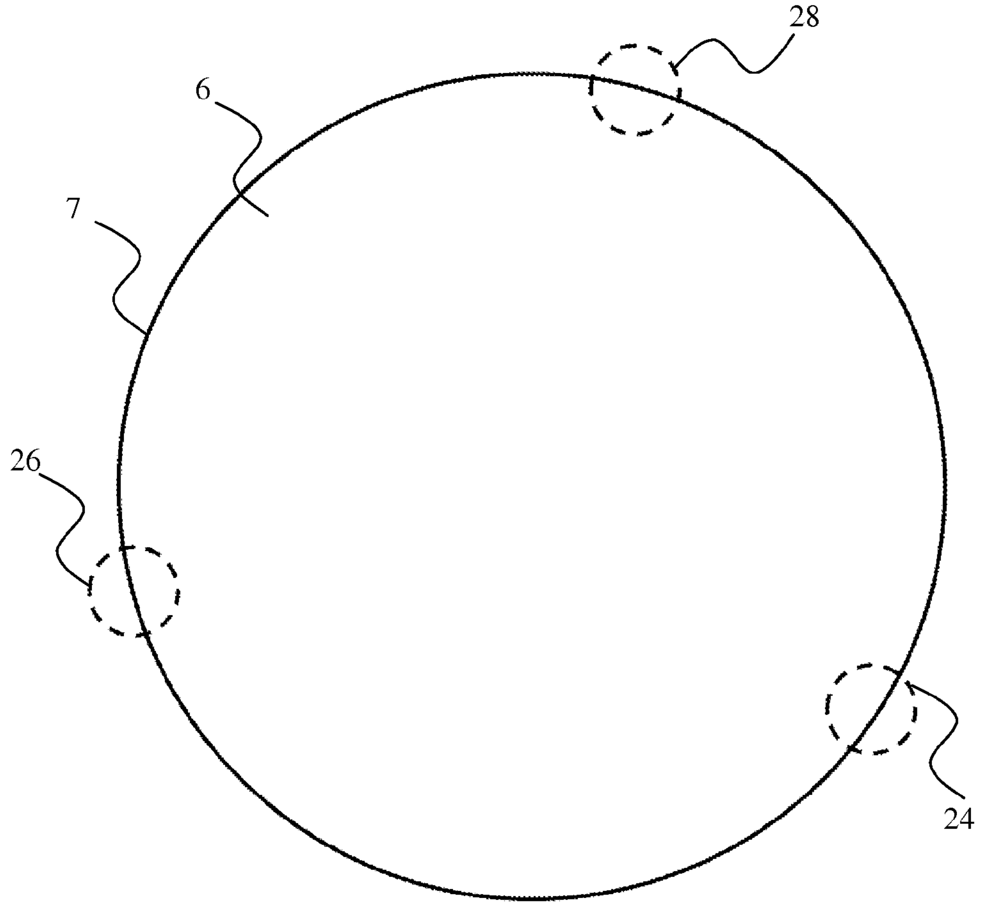

The setting of mutual positions defines a plurality of zones at the at least one shielding structure 6. The plurality of zones includes a first zone 24, a second zone 26, and a third zone 28, see FIG. 2, illustrating the shielding structure of FIG. 1 as seen from the perspective of the transmit antennas 10, 12, 14.

The first zone 24 is defined by that (or given by that): radiation, which emanates from the first transmit antenna 10 and which is diffracted by the at least one shielding structure 6 towards the at least one receive antenna 4, is subject to a lower power loss if diffracted by the at least one shielding structure 6 at the first zone 24 than if diffracted by the at least one shielding structure 6 outside the first zone 24.

The second zone 26 is defined by that: radiation, which emanates from the second transmit antenna 12 and which is diffracted by the at least one shielding structure 6 towards the at least one receive antenna 4, is subject to a lower power loss if diffracted by the at least one shielding structure 6 at the second zone 26 than if diffracted by the at least one shielding structure 6 outside the second zone 26.

The third zone 28 is defined by that: radiation, which emanates from the third transmit antenna 14 and being diffracted by the at least one shielding structure 6 towards the at least one receive antenna 4, is subject to a lower power loss if diffracted by the at least one shielding structure 6 at the third zone 28 than if diffracted by the at least one shielding structure 6 outside the third zone 28.

The at least one frame 8 is furthermore configured for: setting a pointing direction of the first transmit antenna 10 in relation to the at least one shielding structure 6 such that the first transmit minimum 16 points towards the first zone 24, setting a pointing direction of the second transmit antenna 12 in relation to the at least one shielding structure 6 such that the second transmit minimum 18 points towards the second zone 26, and setting a pointing direction of the third transmit antenna 14 in relation to the at least one shielding structure 6 such that the third transmit minimum 20 points towards the third zone 28.

Thus, during operation and correct setup of the antenna assembly 2 the first zone 24 includes the area of the at least one shielding structure 6 where the first transmit minimum 16 is incident. During operation and correct setup of the antenna assembly 2 the second zone 26 includes the area of the at least one shielding structure 6 where the second transmit minimum 18 is incident. During operation and correct setup of the antenna assembly 2 the third zone 28 includes the area of the at least one shielding structure 6 where the third transmit minimum 20 is incident.

FIG. 2 schematically illustrates a part of the antenna assembly 2 illustrated in FIG. 1. The part of the antenna assembly 2 illustrated in FIG. 2 includes the at least one shielding structure 6 as seen from the side of the plurality of transmit antennas. The first zone 24, the second zone 26, and the third zone 28 are schematically illustrated by means of respective dotted-lined circles that merely are illustrative indicators that indicate the location of the respective zones. The zones may have another relative size and/or shape and/or position in relation to a shielding structure than as illustrated in FIG. 2.

Each of the transmit minima, i.e. the first transmit minimum 16, the second transmit minimum 18, and the third transmit minimum 20, points towards respective parts of the first edge 7 of the shielding structure 6 during operation of the antenna assembly where each of the plurality of transmit antennas are transmitting.

The first zone 24 is at (i.e. includes at least a part of) an outline of a first contour of the at least one shielding structure 6 as defined from the position of the first transmit antenna 10. The second zone 26 is at an outline of a second contour of the at least one shielding structure 6 as defined from the position of the second transmit antenna 12. The third zone 28 is at an outline of a third contour of the at least one shielding structure 6 as defined from the position of the third transmit antenna 14.

The antenna assembly 2 (i.e. the at least one frame 8) is configured for setting the position and pointing direction of the first transmit antenna 10 such that the first transmit minimum 16 points along a first diffraction path. The first diffraction path is defined such that it goes about (i.e. around) the at least one shielding structure 6 towards the at least one receive antenna 4. The first diffraction path is shorter than any immediately adjacent path from the first transmit antenna 10 about the at least one shielding structure 6 and towards the at least one receive antenna 4.

The antenna assembly 2 (i.e. the at least one frame 8) is configured for setting the position and pointing direction of the second transmit antenna 12 such that the second transmit minimum 18 points along a second diffraction path. The second diffraction path is defined about the at least one shielding structure 6 towards the at least one receive antenna 4. The second diffraction path is shorter than any immediately adjacent path from the second transmit antenna 12 about the at least one shielding structure 6 and towards the at least one receive antenna 4.

The at least one shielding structure 6 comprises a planar surface part at the first zone 24. The at least one shielding structure comprises an edge 7 at the first zone 24.

The at least one shielding structure 6 comprises a planar surface part at the second zone 26. The at least one shielding structure comprises an edge 7 at the second zone 26.

The at least one shielding structure 6 comprises a planar surface part at the third zone 28. The at least one shielding structure comprises an edge 7 at the third zone 28.

The at least one frame 8 may be configured for adjusting the setting of individual pointing directions of the plurality of transmit antennas.

The embodiment illustrated in FIG. 1 may be installed as a fixed mast configuration, wherein the plurality of transmit antennas are provided below the at least one shielding structure 6, and wherein the at least one receive antenna 4 is provided above the at least one shielding structure 6. Alternatively, a fixed mast configuration may be provided with the at least one receive antenna 4 below the at least one shielding structure 6 and the plurality of transmit antennas above the at least one shielding structure 6.

Figure 3:
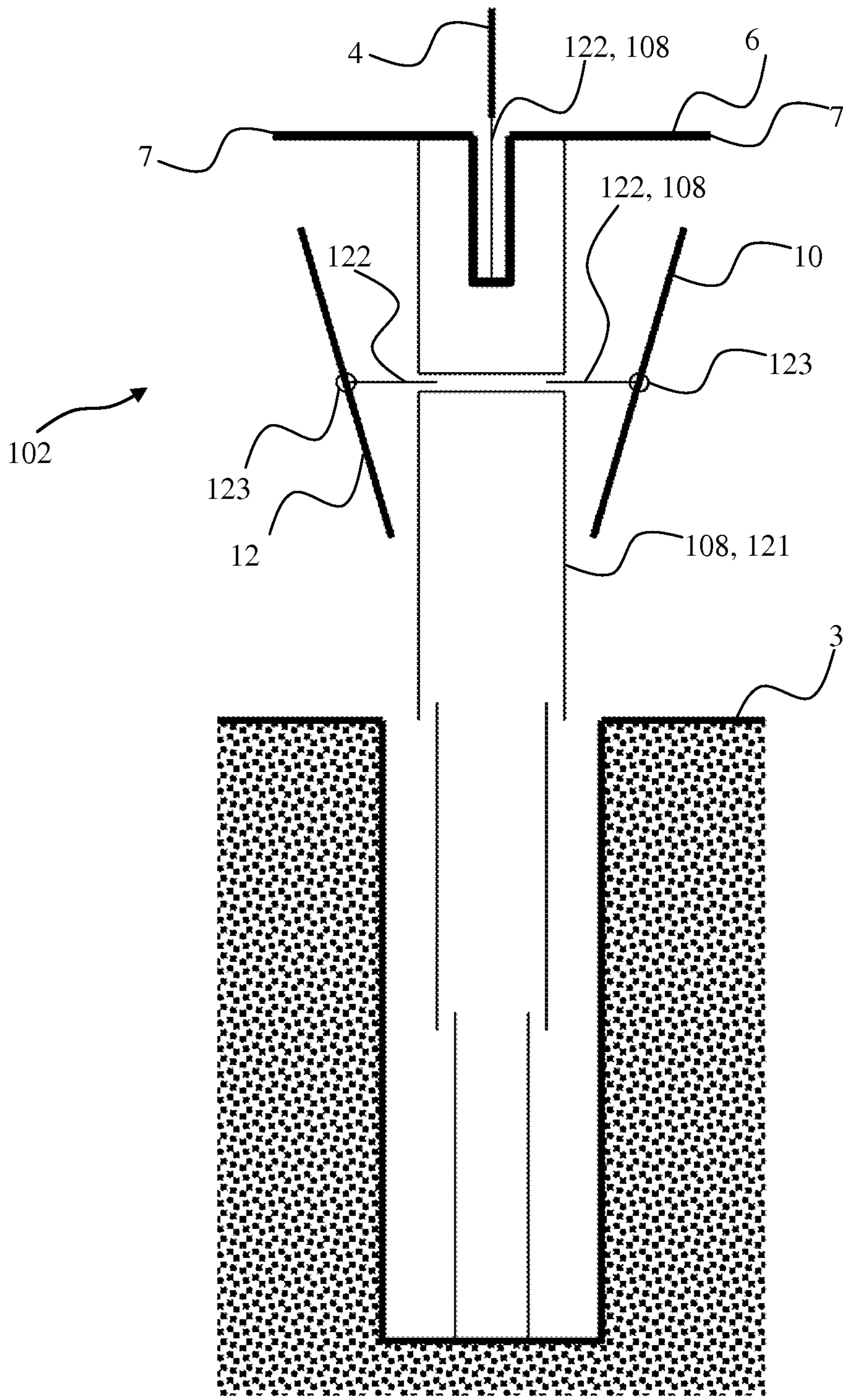
Figure 4:
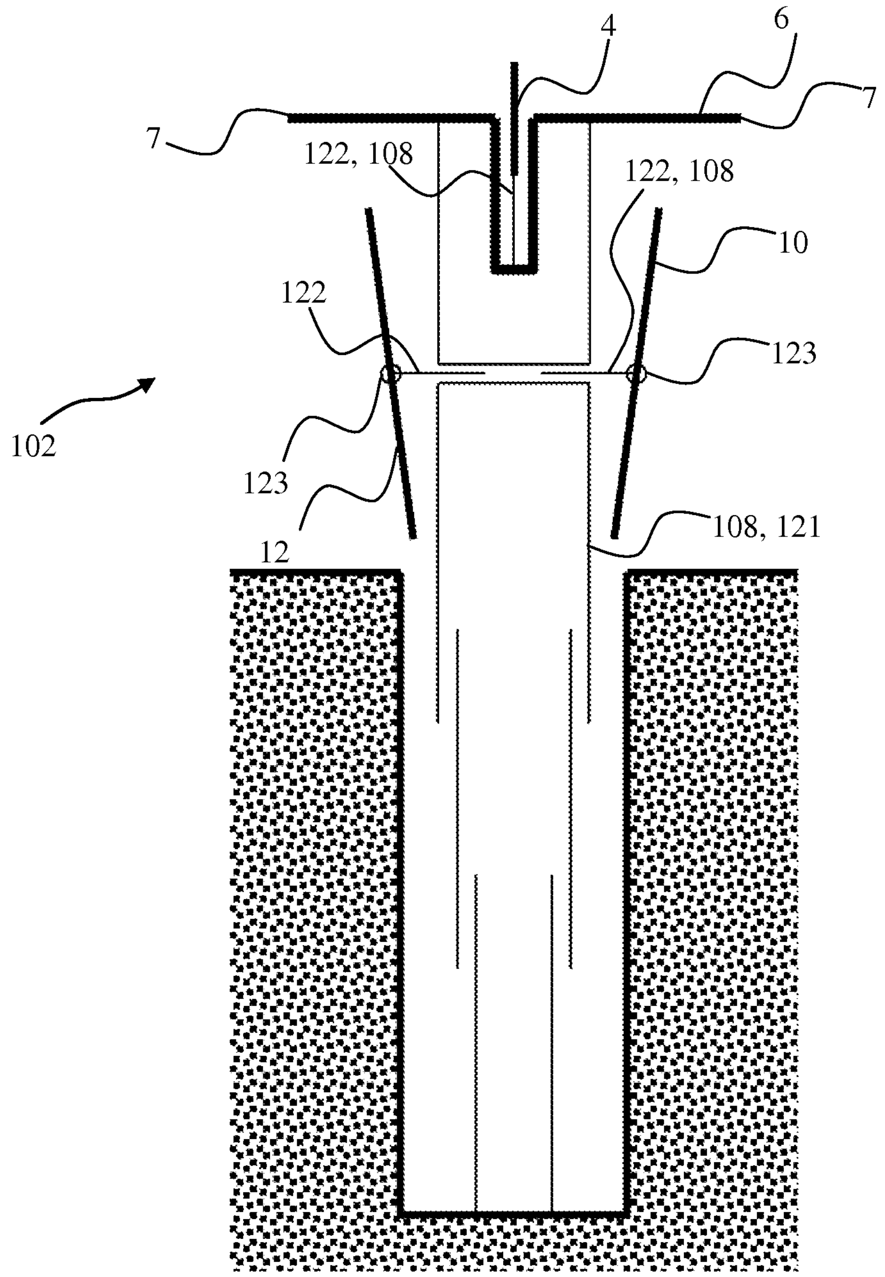
Figure 5:
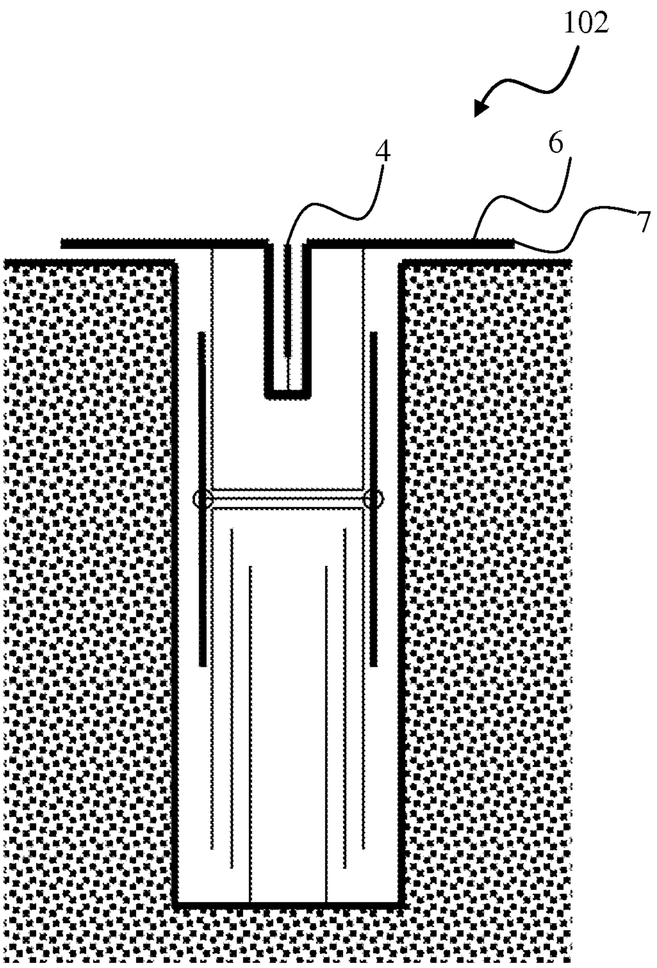

FIGS. 3-5 illustrates a cross sectional view of an embodiment of an antenna assembly 102 according to the present invention in three different respective states, namely an operational state (FIG. 3), a transitional state (FIG. 4), and a folded state (FIG. 5). The embodiment 102 is substantially identical to the embodiment 2. Identical or substantially identical parts will therefore not be described any further. In FIGS. 3-5 only two transmit antennas 10, 12 are illustrated. For the embodiment 102, the at least one frame 108 comprises a mast 121 in form of a telescope tube allowing a lowering and raising of the antennas 4, 10, 12 and shielding structure 6. Furthermore, the at least one frame 108 comprises a plurality of suspension parts 122. Each of the plurality of suspension parts 122 for each of the plurality of transmit antennas 10, 12 are configured for setting of individual pointing directions of the plurality of transmit antennas 10, 12. Each of the plurality of suspension parts 122 comprises respective telescope-like parts for enabling respective linear motions. Furthermore, each of the plurality of suspension parts 122 for each of the plurality of transmit antennas 10, 12 comprises a hinge-like part 123 for performing a rotary motion of the respective transmit antenna 10, 12 for setting respective pointing directions thereof. As an alternative to the hinge-like part 123, a rotary joint (ball joint) could be employed. The antenna assembly 102 may be mounted as a ground installation. The ground installation may be configured to be at least partly retracted within ground 3 or another structure, such as a building etc, e.g. such as illustrated in FIG. 5.

Figure 6:
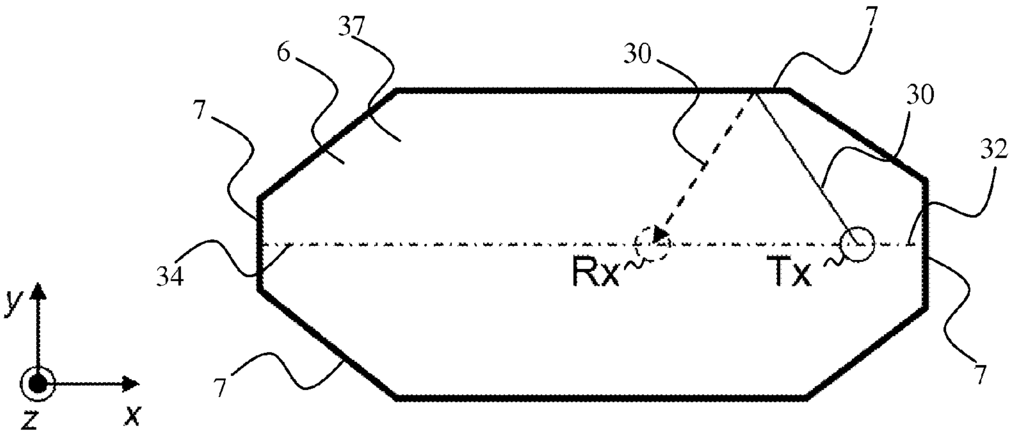
FIGS. 6-7 schematically illustrate an embodiment of the first shielding structure from different perspectives, FIGS. 8-9 schematically illustrate an embodiment of the at least one shielding structure from different perspectives, FIG. 10 schematically illustrates a specific principle of diffraction of radiation, FIG. 11 schematically illustrates a method according to the present invention.
Figure 7:
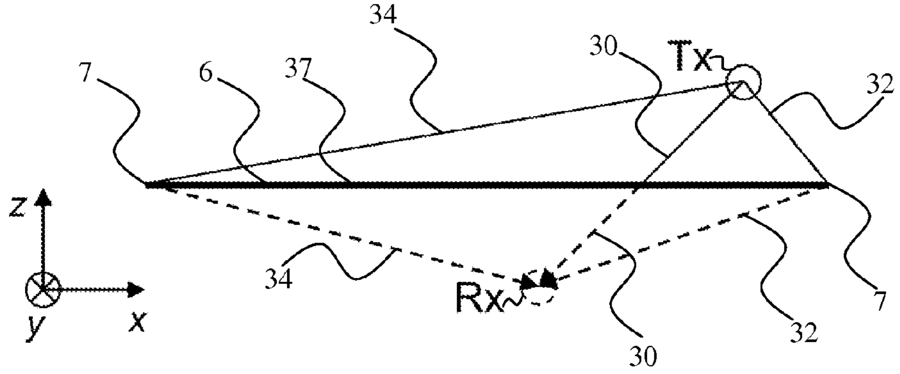

FIG. 6 schematically illustrates at least one shielding structure 6 of an antenna assembly according to the present invention. The at least one shielding structure 6 comprises a polygonal-like shape. FIG. 7 illustrates the at least one shielding structure 6 of FIG. 6 seen along the y-axis. A possible (or at least exemplary) position of a transmit antenna is illustrated by means of the Tx reference illustrated by means of the circle (or sphere) with a solid line. A possible (or at least exemplary) position of a receive antenna is illustrated by means of the Rx reference illustrated by means of the circle (or sphere) with a dashed line. The at least one shielding structure 6 includes a first shielding structure 37. The first shielding structure 37 prevents direct radiation from the Tx position to the Rx position. However, radiation by means of diffraction may e.g. propagate along one of the paths 30, 32, 34 illustrated in FIGS. 6-7. Each of the illustrated paths is shorter than any immediately adjacent path, i.e. a path having an immediately adjacent point of diffraction at an edge 7 of the first shielding structure 37. If the Tx position is the position of the first transmit antenna, the first zone will be defined by the path representing the best coupling of radiation from the Tx position to the Rx position.

Figure 8:
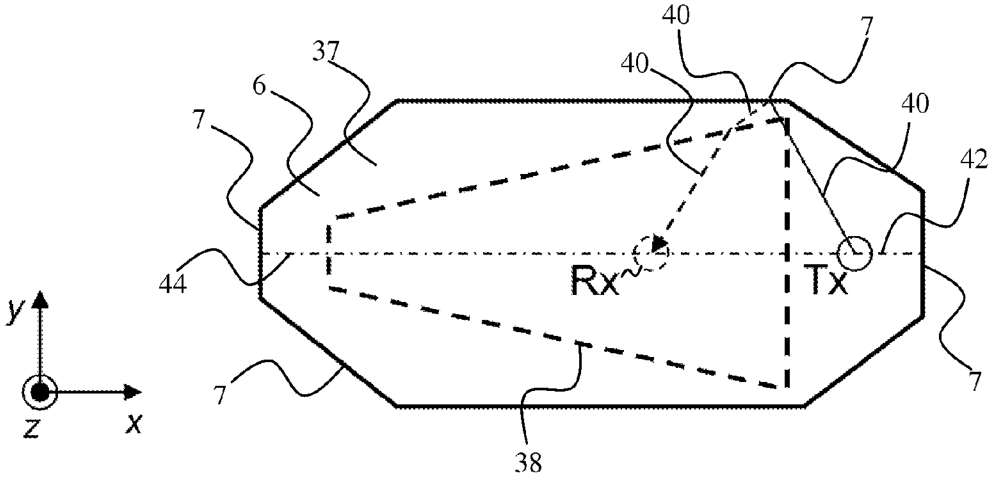
Figure 9:
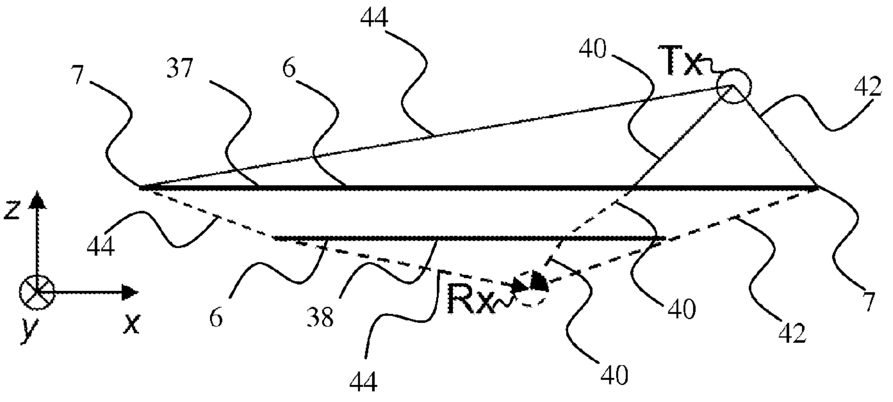

FIG. 8 schematically illustrates an embodiment of at least one shielding structure 6 of an antenna assembly according to the present invention. FIG. 9 illustrates the at least one shielding structure of FIG. 8 seen along the y-axis. Compared to the embodiment of FIGS. 6 and 7, the embodiment of FIGS. 8 and 9 comprises a second shielding structure 38 forming part of the at least one shielding structure 6. For the illustrated embodiment in FIG. 8, the second shielding structure 38 is hidden behind the first shielding structure 37 as seen from the Tx position. However, the second shielding structure 38 affects possible diffraction paths from the Tx position to the Rx position as illustrated by the three different paths 40, 42, 44 having different paths parts.

Figure 10:
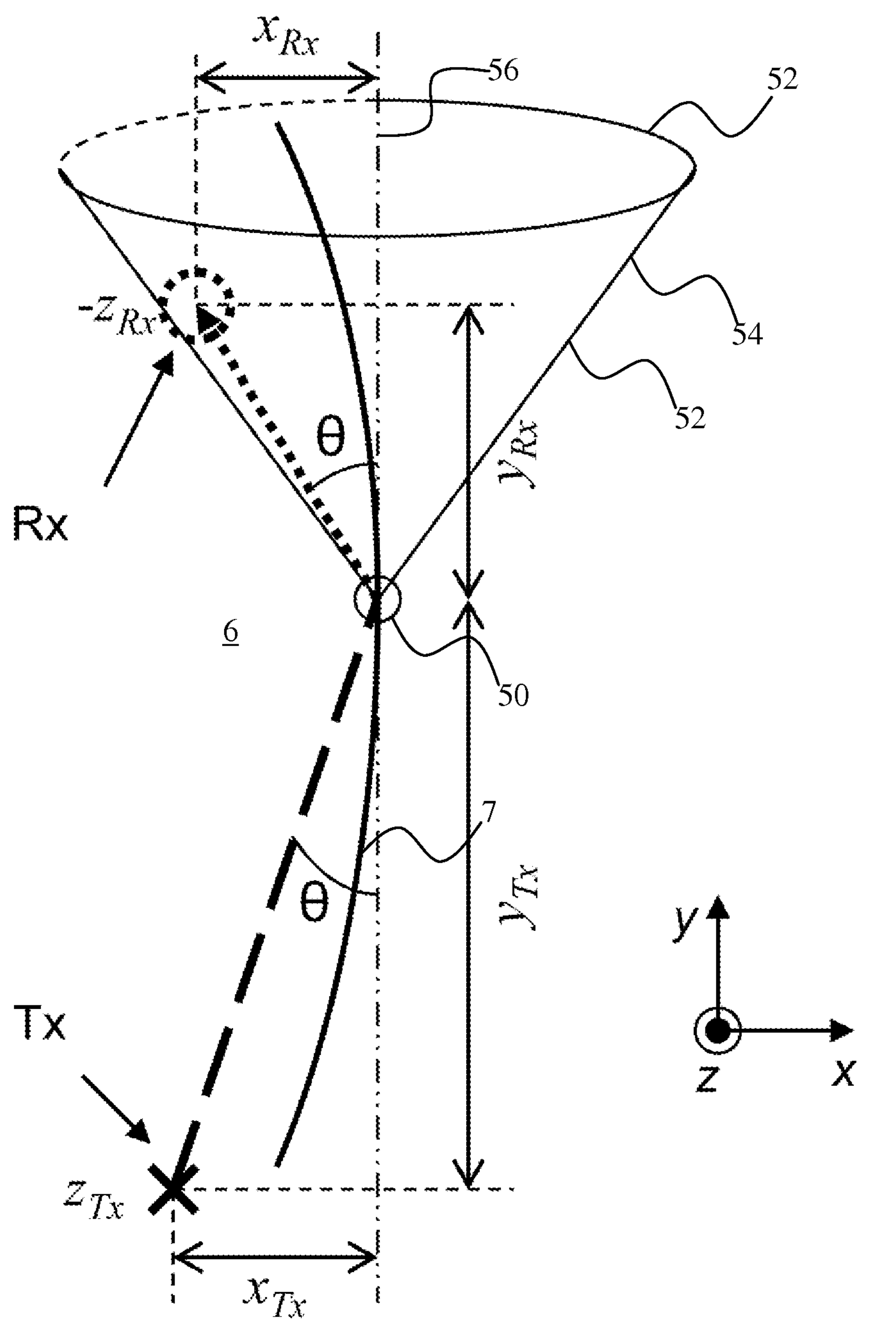

For a system, such as schematically illustrated in FIG. 10, with a transmit antenna and a shielding structure 6 forming a plane in the xy-plane, where the transmit antenna has a point or area of emission (illustrated by a cross marked by Tx), the diffraction may occur at any point (or area) along the contour of the shielding structure as "seen" from the transmit point or area (Tx). In FIG. 10, a planar shielding structure is situated in the xy-plane. The shielding structure has an edge-like perimeter 7. A position of transmission (Tx) is marked by the ($x_{Tx}$, $y_{Tx}$, $z_{Tx}$)-position. A position of receiving (illustrated by a dotted circle marked by Rx) is marked by the ($x_{Rx}$, $y_{Rx}$, $-z_{Rx}$)-position. Thus, the Tx and the Rx are on opposite sides of the shielding structure 6. Due to the shielding structure 6 blocking radiation, radiation from the Tx position cannot arrive at the Rx position along a straight line. However, radiation from the Tx position may arrive to the Rx position by means of diffraction at the edge-like perimeter 7 of the shielding structure 6. Diffraction from a single point (or area) 50 at the perimeter may be defined a cone 52 as illustrated in FIG.

10. The cone 52 may be described by a cone part 54 of a straight line starting from the Tx position, intersecting the point of diffraction 50 and continuing along a straight line, where the cone part is the part starting at the point of diffraction 50. The cone 52 is then described by rotating the cone part 54 around a tangent 56 of the perimeter 7 of the shielding structure 6, where the tangent 56 is defined from the point of diffraction 50.

Thus, for diffraction from the Tx position to arrive at the Rx position, the angle θ defined between the tangent 56 at the point of diffraction 50 and the line from the Tx position to the point of diffraction 50 may need to be equal to the corresponding angle θ defined between the tangent 56 at the point of diffraction and the line from the Rx position to the point of diffraction 50, i.e.:

$$\theta = \arccos\left(\frac{y_{Tx}}{\sqrt{z_{Tx}^2 + x_{Tx}^2 + y_{Tx}^2}}\right) = \arccos\left(\frac{y_{Rx}}{\sqrt{z_{Rx}^2 + x_{Rx}^2 + y_{Rx}^2}}\right)$$

For any given reception point (e.g. potential Rx position) in space that is behind the shielding structure 6 as seen from the transmitting antenna (e.g. potential Tx position), there may be at least one point (or area) along the perimeter edge 7 where the diffraction is such that the Rx coincides with such a cone 52 and thus that this point (Rx) is reached by a diffracted wave of radiation from the transmit antenna (Tx).

Figure 11:
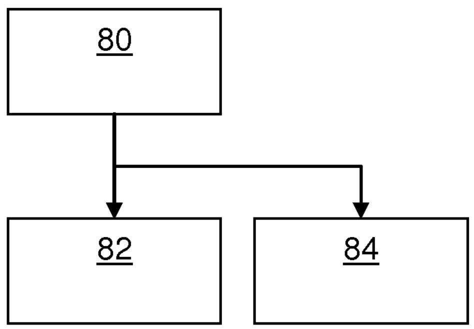

FIG. 11 schematically illustrates a method according to the present invention for shielding at least one receive antenna of an antenna assembly from radiation emanating from a plurality of transmit antennas of the antenna assembly by means of at least one shielding structure of the antenna assembly. The plurality of transmit antennas includes a first transmit antenna and a second transmit antenna. The first transmit antenna has a first transmit pattern with a first transmit minimum when transmitting. The second transmit antenna has a second transmit pattern with a second transmit minimum when transmitting. The at least one receive antenna includes a first receive antenna. The at least one shielding structure is configured for obstructing direct electromagnetic radiation generated by the plurality of transmit antennas.

The method comprises setting 80, by means of at least one frame of the antenna assembly, mutual positions of: the plurality of transmit antennas, the at least one shielding structure, and the at least one receive antenna, such that the at least one shielding structure shields the at least one receive antenna from direct electromagnetic radiation generated by the plurality of transmit antennas. The setting of mutual positions defines a plurality of zones at the at least one shielding structure. The plurality of zones includes a first zone and a second zone. Radiation, which emanates from the first transmit antenna and which is diffracted by the at least one shielding structure towards the at least one receive antenna, is subject to a lower power loss if diffracted by the at least one shielding structure at the first zone than if diffracted by the at least one shielding structure outside the first zone. Radiation, which emanates from the second transmit antenna and which is diffracted by the at least one shielding structure towards the at least one receive antenna, is subject to a lower power loss if diffracted by the at least one shielding structure at the second zone than if diffracted by the at least one shielding structure outside the second zone.

The method furthermore comprises setting 82, by means of the at least one frame, a pointing direction of the first transmit antenna such that the first transmit minimum points towards the first zone, and setting 84, by means of the at least one frame, a pointing direction of the second transmit antenna such that the second transmit minimum points towards the second zone.

Any settings, such as setting of pointing directions) of the first transmit antenna and the second transmit antenna may be carried out simultaneously or at overlapping time intervals. The setting 80 of positions and the settings 82, 84 of pointing directions of the plurality or a specific transmit antenna may be carried out simultaneously or at overlapping time intervals.

Figure 12:
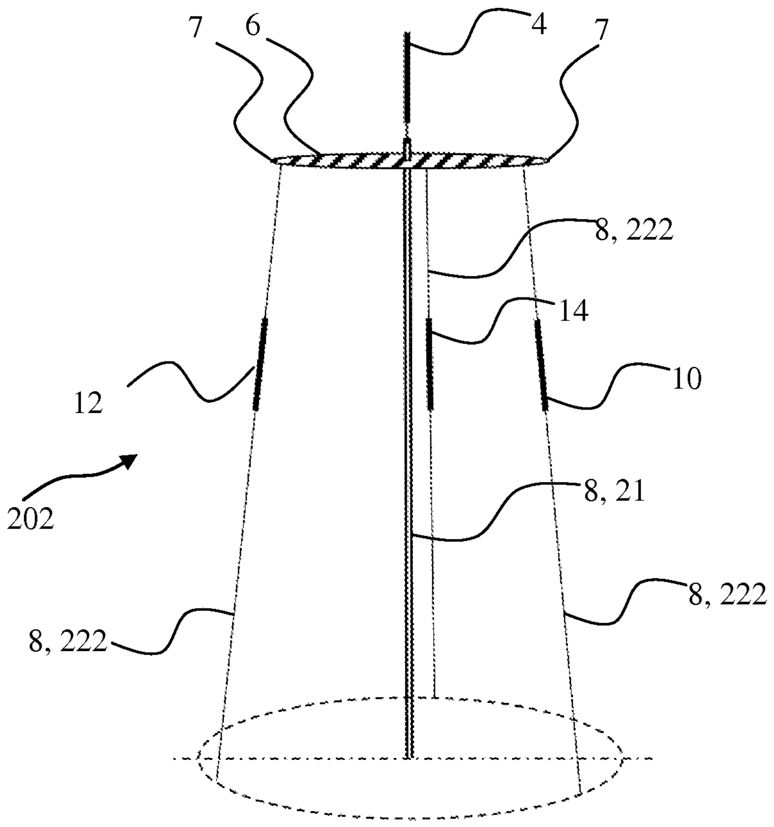
FIG. 12 schematically illustrates a perspective view of an embodiment of the present invention, and FIG. 13 schematically illustrates a perspective view of an embodiment of the present invention.

FIG. 12 schematically illustrates a perspective view of an embodiment of an antenna assembly 202 according to the present invention. The embodiment comprises a stayed mast 21 configuration based on a mast 21 structure (such as a standard mast structure) where the transmit antennas 10, 12, 14 are arranged in conjunction with the staying of the mast 21. The number of stays 222 may be chosen in accordance with the number of transmit antennas. The at least one receive antenna 4 is mounted on top of the mast 21, and above the shielding structure 6, to which the stays are attached. The mast structure (i.e. the at least one frame 8), i.e. including the mast 21 and stays 222, may comprise conductive and/or non-conductive material. Different principles may be used for routing of feeder cables to the antennas, e.g. the mast, the stays, or a combination of these may be employed.

Figure 13:
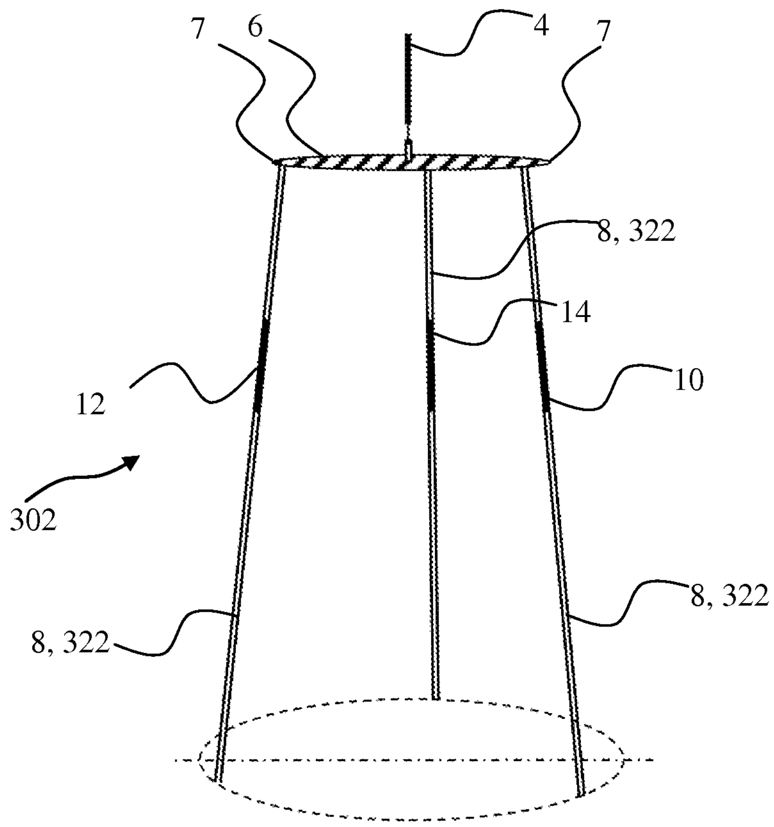

FIG. 13 schematically illustrates a perspective view of an embodiment of the antenna assembly 302 according to the present invention embodied by means of a multi-pod mast configuration, wherein the at least one frame 8 comprises a multi legged support structure 322 carrying a shielding structure 6 upon which the receive antenna 4 (or possibly receive antennas) is mounted. The plurality of transmit antennas 10, 12, 14 forms part of (or are at least connected to) supporting legs 322, for which the number of legs 322 can be chosen in accordance with the number of transmit antennas. The supporting legs 322 may comprise conductive and/or non-conductive material. Different principles may be used for routing of feeder cables to the antennas, e.g. the legs (struts), special stays, or a combination of these may be employed.

The phrase "comprising" should be regarded as a non-exhaustive term in the present disclosure. The phrase "including" should be regarded as a non-exhaustive term in the present disclosure. For instance, an antenna assembly comprising (or including) four antennas (such as transmit and/or receive antennas) (or any number above four) is also considered to comprise (or include) three antennas as well as to comprise (or include) two antennas. An assembly comprising (or including) two antennas may also (but does not necessarily) comprise (or include) three antennas and/or more antennas.

The invention claimed is:

1. Antenna assembly comprising:

a plurality of transmit antennas comprising a first transmit antenna and a second transmit antenna, the first transmit antenna having a first transmit pattern with a first transmit minimum when transmitting, the second transmit antenna having a second transmit pattern with a second transmit minimum when transmitting;

at least one receive antenna including a first receive antenna;

at least one shielding structure configured for obstructing direct electromagnetic radiation generated by the plurality of transmit antennas; and at least one frame configured for setting mutual positions of:

the plurality of transmit antennas;

the at least one shielding structure; and the at least one receive antenna, such that the at least one shielding structure shields the at least one receive antenna from direct electromagnetic radiation generated by the plurality of transmit antennas, wherein:

the setting of mutual positions defines a plurality of zones at the at least one shielding structure, the plurality of zones including a first zone and a second zone;

radiation, which emanates from the first transmit antenna and which is diffracted by the at least one shielding structure towards the at least one receive antenna, is subject to a lower power loss if diffracted by the at least one shielding structure at the first zone than if diffracted by the at least one shielding structure outside the first zone;

radiation, which emanates from the second transmit antenna and which is diffracted by the at least one shielding structure towards the at least one receive antenna, is subject to a lower power loss if diffracted by the at least one shielding structure at the second zone than if diffracted by the at least one shielding structure outside the second zone; and the at least one frame is configured for:

setting a pointing direction of the first transmit antenna such that the first transmit minimum points towards the first zone; and setting a pointing direction of the second transmit antenna such that the second transmit minimum points towards the second zone.

2. Antenna assembly according to claim 1, wherein:

the first zone is at an outline of a first contour of the at least one shielding structure as defined from the position of the first transmit antenna; and the second zone is at an outline of a second contour of the at least one shielding structure as defined from the position of the second transmit antenna.

3. Antenna assembly according to claim 1, wherein:

the antenna assembly is configured for setting the pointing direction of the first transmit antenna such that the first transmit minimum points along a first diffraction path, the first diffraction path being about the at least one shielding structure towards the at least one receive antenna;

the antenna assembly is configured for setting the pointing direction of the second transmit antenna such that the second transmit minimum points along a second diffraction path, the second diffraction path being about the at least one shielding structure towards the at least one receive antenna;

the first diffraction path is shorter than any immediately adjacent path from the first transmit antenna about the at least one shielding structure and towards the at least one receive antenna; and the second diffraction path is shorter than any immediately adjacent path from the second transmit antenna about the at least one shielding structure and towards the at least one receive antenna.

4. Antenna assembly according to claim 3, wherein:

radiation along the first diffraction path is subject to a plurality of diffractions by the at least one shielding structure; and radiation along the second diffraction path is subject to a plurality of diffractions by the at least one shielding structure.

5. Antenna assembly according to claim 1, wherein the at least one shielding structure comprises a planar surface part at the first zone.

6. Antenna assembly according to claim 1, wherein the at least one shielding structure comprises a first edge at the first zone.

7. Antenna assembly according to claim 1, wherein the at least one shielding structure comprises a radiation absorbing material such as a radiation absorbing coating.

8. Antenna assembly according to claim 7, wherein the at least one shielding structure comprises the radiation absorbing material at the plurality of zones.

9. Antenna assembly according to claim 1, wherein:

the plurality of transmit antennas comprises a third transmit antenna having a third transmit pattern with a third transmit minimum when transmitting and wherein the plurality of zones includes a third zone defined by the setting of position of the third transmit antenna;

radiation, which emanates from the third transmit antenna and being diffracted by the at least one shielding structure towards the at least one receive antenna, is subject to a lower power loss if diffracted by the at least one shielding structure at the third zone than if diffracted by the at least one shielding structure outside the third zone;

the antenna assembly is further configured for setting the pointing direction of the third transmit antenna such that the third transmit minimum points towards the third zone.

10. Antenna assembly according to claim 1, wherein each of the plurality of transmit antennas are configured for transmitting independent signals.

11. Antenna assembly according to claim 1, wherein the plurality of transmit antennas are dipole antennas, such as folded dipole antennas.

12. Antenna assembly according to claim 1, wherein the first transmit antenna is collinear with the second transmit antenna.

13. Antenna assembly according to claim 1, wherein the at least one receive antenna comprises a second receive antenna.

14. Antenna assembly according to claim 1, wherein each of the plurality of transmit antennas have an longitudinal extension of at least 5 cm.

15. Antenna assembly according to claim 1, wherein the plurality of transmit antennas are configured for transmitting at a frequency within 30 MHz and 3 GHz.

16. Antenna assembly according to claim 1, wherein the at least one frame is configured for adjusting the setting of individual pointing directions of the plurality of transmit antennas.

17. Antenna assembly according to claim 1, wherein the at least one frame forms an integral part with the at least one shielding structure.

18. Antenna assembly according to claim 1, wherein the antenna assembly comprises a stabilized platform onto which the at least one frame is mounted.

19. Use of an antenna assembly according to claim 1, wherein the antenna assembly is mounted at least one of in or on a vehicle, such as a ship or an aircraft.

20. Use of an antenna assembly according to claim 1, wherein the antenna assembly is mounted at least one of in or on a building or mounted as a ground installation.

21. Method for shielding at least one receiver antenna of an antenna assembly from radiation emanating from a plurality of transmit antennas of the antenna assembly by means of at least one shielding structure of the antenna assembly, the plurality of transmit antennas comprising a first transmit antenna and a second transmit antenna, the first transmit antenna having a first transmit pattern with a first transmit minimum when transmitting, the second transmit antenna having a second transmit pattern with a second transmit minimum when transmitting, the at least one receive antenna including a first receive antenna, the at least one shielding structure being configured for obstructing direct electromagnetic radiation generated by the plurality of transmit antennas, the method comprising:

setting, by means of at least one frame of the antenna assembly, mutual positions of:
the plurality of transmit antennas;
the at least one shielding structure; and
the at least one receive antenna, such that the at least one shielding structure shields the at least one receive antenna from direct electromagnetic radiation generated by the plurality of transmit antennas,
wherein:
the setting of mutual positions defines a plurality of zones at the at least one shielding structure;
the plurality of zones including a first zone and a second zone, wherein radiation, which emanates from the first transmit antenna and which is diffracted by the at least one shielding structure towards the at least one receive antenna, is subject to a lower power loss if diffracted by the at least one shielding structure at the first zone than if diffracted by the at least one shielding structure outside the first zone; and
radiation, which emanates from the second transmit antenna and which is diffracted by the at least one shielding structure towards the at least one receive antenna, is subject to a lower power loss if diffracted by the at least one shielding structure at the second zone than if diffracted by the at least one shielding structure outside the second zone;
setting, by means of the at least one frame, a pointing direction of the first transmit antenna such that the first transmit minimum points towards the first zone, and
setting, by means of the at least one frame, a pointing direction of the second transmit antenna such that the second transmit minimum points towards the second zone.

22. Method according to claim 21, wherein the antenna assembly is an antenna assembly according to claim 1.

* * * * *